United States Patent [19]

Uchikawa et al.

[11] Patent Number: 5,051,647
[45] Date of Patent: Sep. 24, 1991

[54] ULTRASONIC MOTOR

[75] Inventors: Tadao Uchikawa; Osamu Ohnishi; Osamu Myohga; Takeshi Inoue, all of Tokyo, Japan

[73] Assignee: NEC Corporation, Japan

[21] Appl. No.: 548,574

[22] Filed: Jul. 5, 1990

[30] Foreign Application Priority Data

| Jul. 6, 1989 | [JP] | Japan | 1-176511 |
| Jul. 6, 1989 | [JP] | Japan | 1-176512 |
| Jul. 10, 1989 | [JP] | Japan | 1-178553 |
| Jul. 10, 1989 | [JP] | Japan | 1-178554 |
| Jul. 10, 1989 | [JP] | Japan | 1-178555 |

[51] Int. Cl.$^5$ .................................. H01L 41/08
[52] U.S. Cl. ................................ 310/323; 310/325; 310/328; 310/333
[58] Field of Search ............... 310/323, 328, 325, 333

[56] References Cited

U.S. PATENT DOCUMENTS

| 4,210,837 | 7/1980 | Vasiliev et al. | 310/323 |
| 4,703,214 | 10/1987 | Mishiro | 310/328 |
| 4,812,697 | 3/1989 | Mishiro | 310/323 |
| 4,885,499 | 12/1989 | Ueha et al. | 310/328 |
| 4,947,076 | 8/1990 | Kumada | 310/323 |
| 4,993,590 | 6/1990 | Inoue et al. | 310/328 X |

OTHER PUBLICATIONS

O. Ohnishi et al., "Piezoelectric Ultrasonic Motor Using Longitudinal-Torsional Composite Vibration of a Cylindrical Resonator", 1989 IEEE, 1989 Ultrasonics Symposium, pp. 739-743.
S. Takahashi et al., "Ultrasonic Motor Using Longitudinal-Torsional Composite Vibration", Proceedings by Nippon Onkyo Gakkai, Oct. 1988, pp. 821-822.

Primary Examiner—Mark O. Budd
Attorney, Agent, or Firm—Leydig, Voit & Mayer

[57] ABSTRACT

In an ultrasonic motor which uses, as a stator, a longitudinal-torsional composite vibrator in which longitudinal and torsional piezoelectric elements are sandwiched between two blocks, and urges a rotor against the stator, a member is arranged on a piezoelectric element side of the block located near the rotor, so that an inertial mass of the member becomes larger with respect to torsional vibration than that of a rotor side.

20 Claims, 14 Drawing Sheets

ULTRASONIC MOTOR

BACKGROUND OF THE INVENTION

The present invention relates to an ultrasonic motor which employs a longitudinal-torsional composite vibrator consisting of a stator as a generation source of a rotational torque, and rotates a rotor pressed on the stator via a frictional force.

The ultrasonic motor utilizes a rotational torque received through a frictional force by a rotor pressed against a stator which serves as a vibrator for causing ultrasonic elliptical vibration.

Demand has arisen for a motor which has a small diameter and a large torque. As an ultrasonic motor having such a function, the present inventors proposed an ultrasonic motor which uses a longitudinal torsional composite vibrator as a stator, disclosed in Proc. 1988 Autumn meeting, Acoustic Society of Japan No. 2-4-10, pp. 821 to 822 (Oct., 1988).

Figure 13:
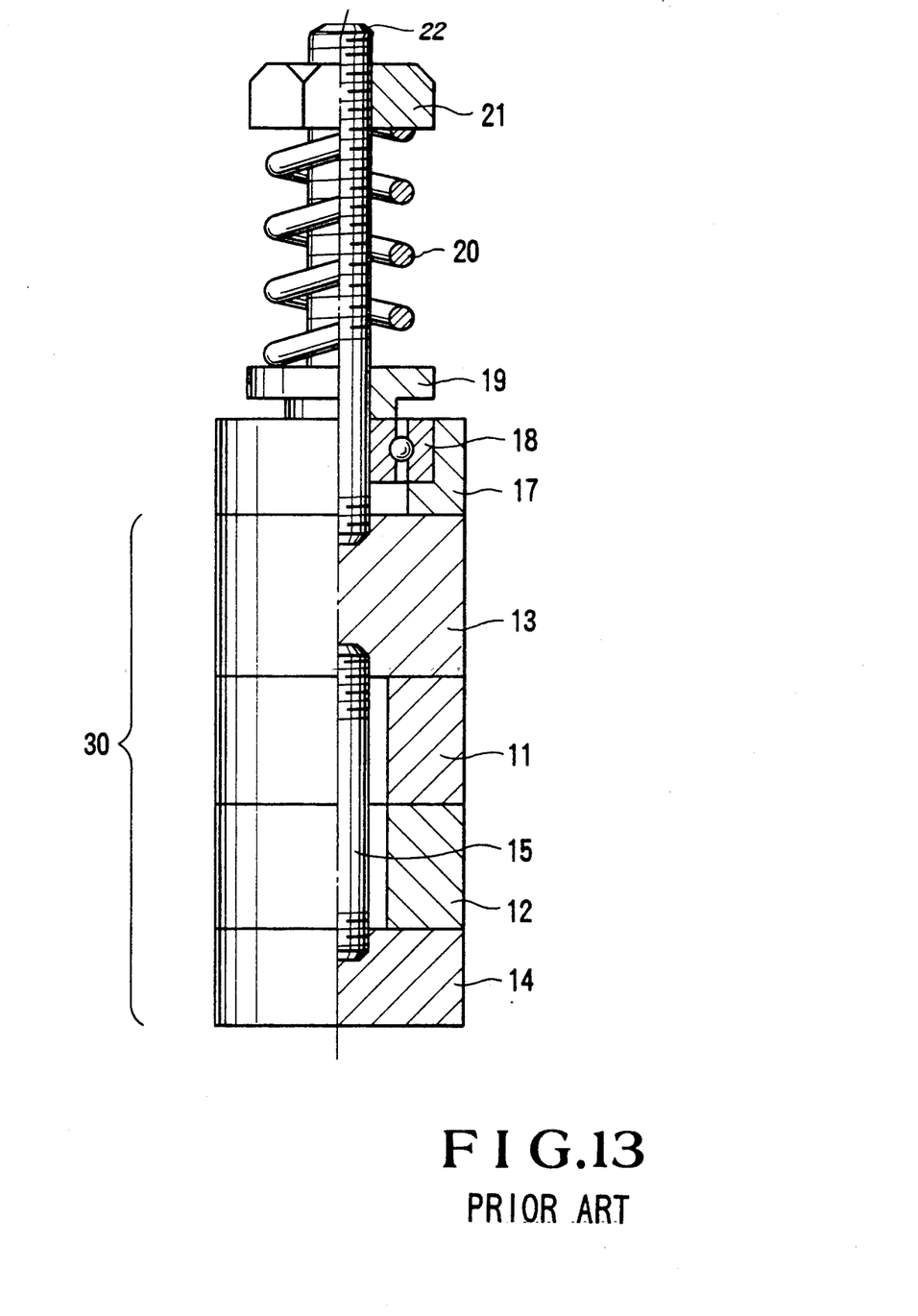
FIG. 13 is a partial sectional front view of a conventional ultrasonic motor.
Figure 14:
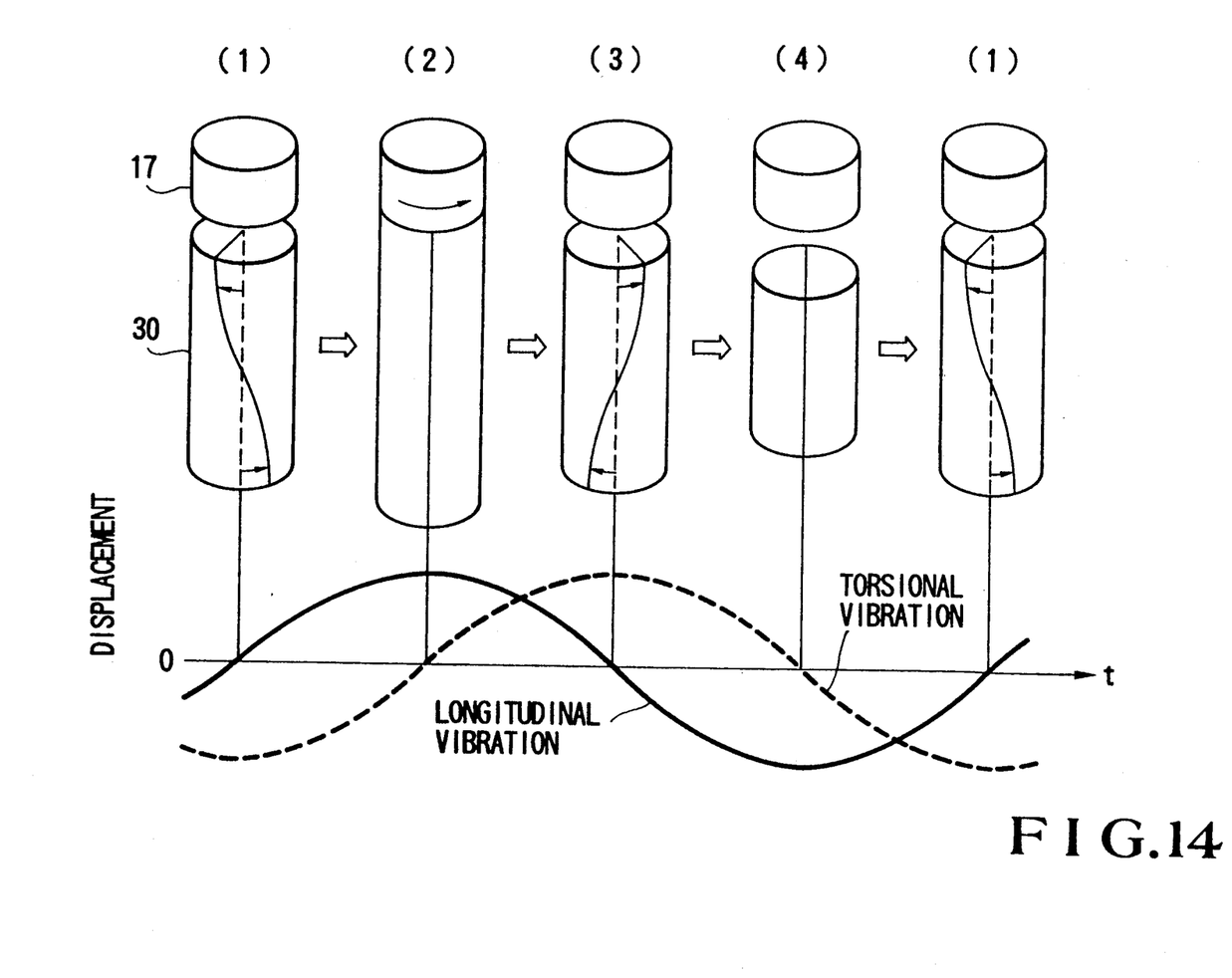
FIG. 14 is a view showing the operational principle of the conventional ultrasonic motor.

FIG. 13 shows the arrangement of this prior art ultrasonic motor. In FIG. 13, reference numeral 11 denotes a piezoelectric ceramic element for causing longitudinal vibration. The element 11 is subjected to a polarization treatment in a direction of thickness. Reference numeral 12 denotes a piezoelectric ceramic element for causing torsional vibration. The element 12 is subjected to a polarization treatment in a circumferential direction parallel to its surface. These piezoelectric elements 11 and 12 are securely fastened by a head mass 13, a rear mass 14, and a bolt 15, which are formed of an Al alloy, thereby constituting a stator 30 as an ultrasonic elliptical vibrator. Reference numeral 20 denotes a spring for biasing a rotor 17 against the stator; 19, a base; 22, a shaft; and 21, a nut. The biasing force of the spring can be adjusted by the nut 21. FIG. 14 shows the operational principle of the ultrasonic motor. The longitudinal vibration serves as "clutch", and a torsional displacement in only one direction is transmitted to the rotor.

The ultrasonic motor has been proposed to aim at resonantly driving longitudinal and torsional vibrations at the same time in order to efficiently and strongly excite elliptical vibration obtained by synthesizing the longitudinal and torsional vibrations at the interface between the stator and rotor. In order to perform resonant driving, the resonant frequencies of the longitudinal and torsional vibrations must coincide with each other. In the ultrasonic motor shown in FIG. 13, a shaft having a proper thickness stands upright on the stator to adjust a pressing force between the rotor and the stator, so that the resonant frequencies of the longitudinal and torsional vibrations can marginally coincide with each other in a weak electric field mode.

The resonant frequencies of the longitudinal and torsional vibrations can coincide with each other in the weak electric field mode. However, when a motor is driven in a strong electric field mode in practice, a resonant frequency $f_T$ of the torsional vibration becomes higher than a resonant frequency $f_L$ of the longitudinal vibration. Thus, it is difficult to cause resonant frequencies to coincide with each other in the strong electric field mode as an actual driving state. In the ultrasonic motor having the arrangement shown in FIG. 13, the resonant frequency $f_T$ of the torsional vibration is almost determined by the length of the stator portion, and is not so influenced by the pressing force. However, the resonant frequency $f_L$ of the longitudinal vibration depends on the mass of the rotor and the pressing force between the rotor and the stator. As the mass of the rotor is smaller and the pressing force is larger, the resonant frequency $f_L$ becomes closer to that of the torsional vibration.

More specifically, in the ultrasonic motor having the arrangement shown in FIG. 13, $f_T > f_L$ in general. Therefore, in order to achieve $f_T = f_L$, the weight of the rotor must be reduced. For this purpose, the height of the rotor must be decreased. However, the rotor having such a shape provides only a small rigidity, and can hardly generate a large torque. Alternatively, the pressing force must be extremely increased. An extreme increase in pressing force inevitably applies an excessive stress to a bearing, and leads to damage to and a short service life of the bearing. Therefore, in the conventional ultrasonic motor shown in FIG. 13, $f_T$ is higher than $f_L$ in an actual high-power driving state, and total efficiency is at most about 25% to 40%.

SUMMARY OF THE INVENTION

It is therefore an object of the present invention to provide an ultrasonic motor which can cause resonant frequencies of longitudinal and torsional vibrations to coincide with each other with a simple arrangement.

According to the first aspect of the present invention, there is provided an ultrasonic motor which uses, as a stator, a longitudinal-torsional composite vibrator in which longitudinal and torsional piezoelectric elements are sandwiched between two blocks, and urges a rotor against the stator, wherein a member is arranged on a piezoelectric element side of the block located near the rotor, so that an inertial mass of the member becomes larger with respect to torsional vibration than that on a rotor side.

According to the second aspect of the present invention, a disk which has an outer diameter larger than an outer diameter of the piezoelectric element and is formed of a material whose product of a density and an elastic modulus is larger than that of a material of the blocks is arranged between the block and the piezoelectric element which are located near the rotor.

According to the third aspect of the present invention, grooves are formed at equal intervals in an outer peripheral portion of the disk.

According to the fourth aspect of the present invention, the outer diameter of the torsional vibration piezoelectric element is set to be smaller than that of the longitudinal vibration piezoelectric element.

According to the fifth aspect of the present invention, a ring formed of a material whose product of a density and an elastic modulus is larger than that of the material of the block is arranged on the outer periphery of the block near the rotor.

According to the sixth aspect of the present invention, the diameter on the vibrator joint side of the block near the rotor is set to be larger than that on the rotor contact side of the block.

According to the seventh aspect of the present invention, the block near the rotor is formed by joining at least two materials having different densities, so that a low-density material is arranged on the rotor contact side, and a high-density material is arranged on the piezoelectric vibrator joint side.

The present invention is made to cause resonant frequencies of longitudinal and torsional vibrations to perfectly coincide with each other and to improve motor efficiency in an ultrasonic motor which uses a longitudinal-torsional composite vibrator as a stator. For this purpose, according to the present invention, a material used for a stator portion, especially, for a head mass portion, and a head mass structure are optimized, so that the resonant frequencies of the longitudinal and torsional vibrations can perfectly coincide with each other. This principle will be described in detail below.

Figure 15A:
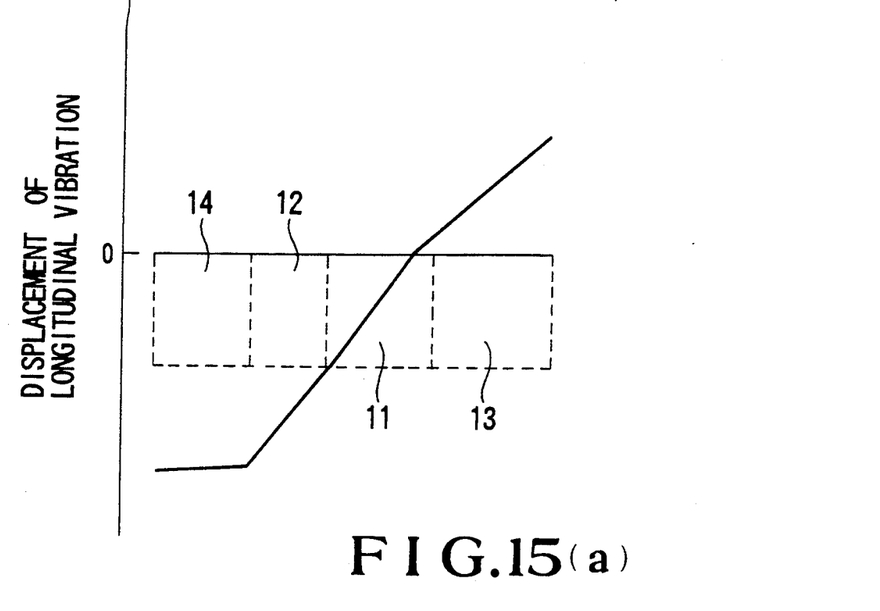
FIGS. 15(a) and 15(b) are graphs showing displacement distributions of the conventional ultrasonic motor.
Figure 15B:
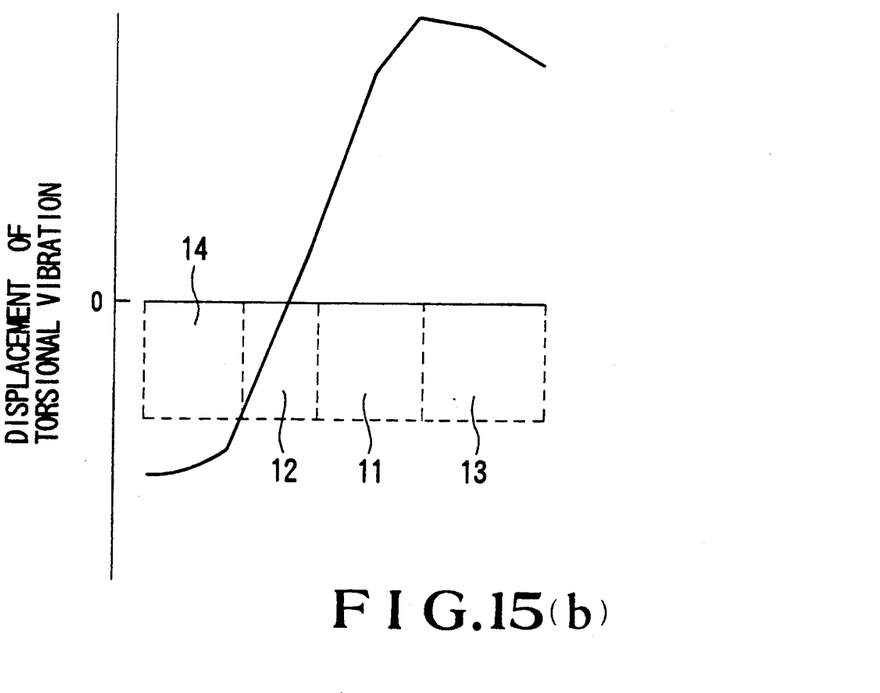

FIGS. 15(a) and 15(b) show vibration displacement distributions in a high electric field driving mode of the conventional ultrasonic motor shown in FIG. 13. The longitudinal and torsional vibrations have different vibration displacement distributions for the following reason. That is, the phase velocity of a longitudinal elastic wave is larger by 1.6 times than that of a torsional elastic wave. A characteristic mechanical impedance $Z_{OL}$ of the longitudinal vibration for a hollow cylinder is given by:

$$Z_{OL} = \rho c_L A = (\pi/4)(\rho E)^{0.5}(D_O^2 - D_I^2) \quad (1)$$

A characteristic mechanical impedance $Z_{OT}$ of the torsional vibration for a hollow cylinder is given by:

$$Z_{OT} = \rho c_T J_P = (\pi/32)(\rho G)^{0.5}(D_O^4 - D_I^4) \quad (2)$$

Thus, $Z_{OL}$ is expressed as a quadratic function of the diameter, and $Z_{OT}$ is expressed as a quartic function of the diameter.

where
$\rho$: Density
$C_L$: Phase velocity of longitudinal elastic wave
$C_T$: Phase velocity of torsional elastic wave
A: Sectional area of hollow cylinder
E: Longitudinal elastic modulus
G: Torsional elastic modulus
$D_O$: Outer diameter
$D_I$: Inner diameter
$J_P$: Polar moment of inertia of hollow cylinder area The longitudinal and torsional vibration modes will be examined in detail below. As is apparent from FIGS. 15(a) and 15(b), amplitude curves show a large difference in the head mass portion. More specifically, according to the principle of the present invention, the characteristic mechanical impedances $Z_{OL}$ and $Z_{OT}$ are changed in the head mass portion to change the vibration modes, thereby causing the resonant frequencies of the longitudinal and torsional vibrations to coincide with each other.

According to the present invention, the characteristic mechanical impedances in the head mass portion are optimized, so that the resonant frequencies of the longitudinal and torsional vibrations in a high-power driving mode can coincide with each other.

Paying attention to a head mass portion of vibration displacement distributions of a conventional ultrasonic motor employing a longitudinal torsional composite vibrator as a stator shown in FIGS. 15(a) and 15(b), it operates as a stiffness located near a vibration node in terms of the longitudinal vibration and serves as a vibration loop in terms of the torsional vibration to operate as an inertial mass in a portion near a longitudinal piezoelectric ceramic element of the head mass. In this state, the resonant frequency $f_T$ of the torsional vibration is higher than the resonant frequency $f_L$ of the longitudinal vibration. However, in the ultrasonic motor according to the present invention, a disk having an outer diameter larger than that of a piezoelectric element and formed of a material such as stainless steel, molybdenum, or the like having a density and an elastic modulus larger than those of an Al, Mg, or Ti alloy is arranged between a relatively lightweight head mass formed of the Al, Ti, or Mg alloy, and the piezoelectric element, so that the head mass portion can realize a larger stiffness with respect to the longitudinal vibration, and can realize a larger inertial mass with respect to the torsional vibration.

Therefore, in the ultrasonic motor of the present invention, according to the above-mentioned improvements, the resonant frequency $f_T$ of the torsional vibration is decreased, and the resonant frequency $f_L$ of the longitudinal vibration can be increased, so that $f_T = f_L$ can be realized in the high-power driving mode.

BRIEF DESCRIPTION OF THE DRAWINGS

FIG. 6 is a partial sectional front view of the third embodiment;

DESCRIPTION OF THE PREFERRED EMBODIMENTS

Figure 1:
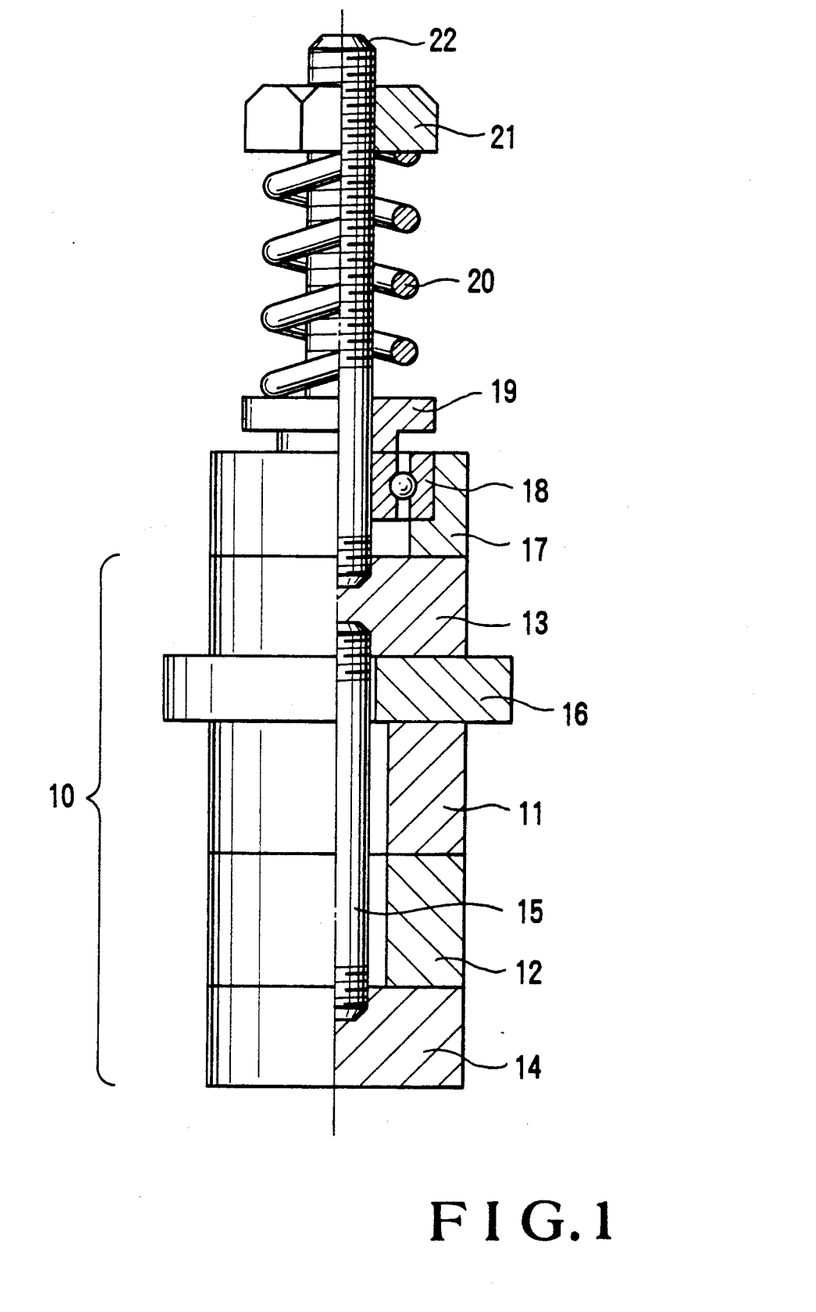
FIG. 1 is sectional front view of a right half portion of the first embodiment of an ultrasonic motor according to the present invention.

FIG. 1 shows the first embodiment of the present invention. The first embodiment will be described below with reference to the drawings. The total length of the ultrasonic motor of this embodiment is 70 mm, and the diameter of a rear mass 14 is 20 mm. A head mass 13 formed of an Al alloy has an outer diameter of 20 mm, and a height of 6 mm. A head mass 16 comprising a stainless steel disk has an inner diameter of 9 mm, an outer diameter of 24 mm, and a height of 5 mm. Reference numeral 11 denotes a longitudinal vibration excitation PZT piezoelectric ceramic element having an outer diameter of 20 mm and an inner diameter of 10 mm; 12, a torsional vibration excitation PZT piezoelectric ceramic element having an outer diameter of 20 mm and an inner diameter of 10 mm; and 14, a stainless steel rear mass. The portion between the head mass 13 and the rear mass 14 is securely fastened by a strainless steel bolt 15, thus constituting a stator 10 as a longitudinal-torsional composite vibrator.

In this embodiment, the bolt 15 is fastened to the head mass 13. However, the head masses 13 and 16 may be integrated by a given means such as welding, and the bolt 15 may be fastened to the head mass 16. In this case, the same effect as in this embodiment can be obtained.

Reference numeral 17 denotes a stainless steel rotor having a height of 8 mm; 18, a bearing; 19, a stainless steel base; 22, a stainless steel shaft; 20, a spring; and 21, a nut. The shaft 22, the spring 20, and the nut 21 supply a force for pressing the rotor 17 against the stator 10. A pressing force between the rotor and the stator can be finely changed by adjusting a rotational angle of the nut.

When AC voltages are applied to the longitudinal and torsional excitation piezoelectric elements 11 and 12, a phase difference between the voltages is appropriately adjusted, and the resonant frequencies of longitudinal and torsional vibrations are caused to coincide with each other in a high-power excitation mode, a strong elliptical vibration obtained by synthesizing amplitudes of the longitudinal and torsional vibrations can be induced at the interface between the stator 10 and the rotor 17. The head mass 16 serves to increase the resonant frequency of the longitudinal vibration due to an increase in stiffness, and serves to considerably decrease the resonant frequency since it serves as a large inertial mass with respect to the torsional vibration.

In the ultrasonic motor having the outer dimensions shown in FIG. 1, when the pressing force between the rotor and the stator was set to be constant (e.g., 50 kgf) and the driving voltages of the longitudinal and torsional piezoelectric ceramic elements were set to be 80 $V_{rms}$ to perform high-power excitation, the resonant frequency of the longitudinal vibration was 32.2 kHz, and the resonant frequency of the torsional vibration was 31.1 kHz. Thus, the mass was decreased by cutting off the outer periphery of the head mass 16 to adjust a frequency. As a result, the resonant frequencies of the longitudinal and torsional vibrations coincided with each other at 32.1 kHz.

Figure 2:
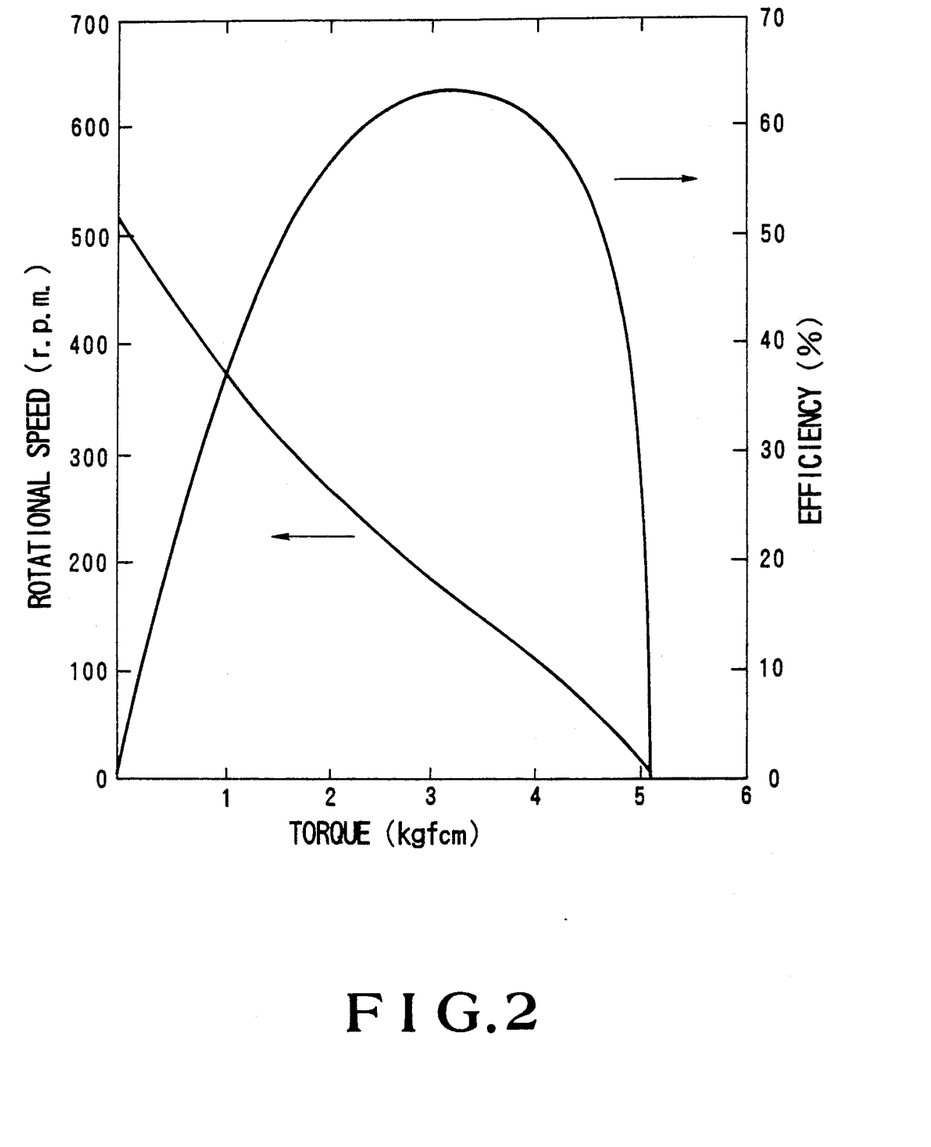
FIG. 2 is a graph showing characteristics of the ultrasonic motor of the first embodiment.

When the phase difference between the voltages to be applied to the piezoelectric elements 11 and 12 was set to be 70° while the driving voltages were left unchanged, the motor was rotated clockwise. FIG. 2 shows measurement results of rotational speed-torque characteristics at that time. In various characteristics of the ultrasonic motor, a rotational speed is 560 r.p.m., a maximum torque is 5.3 kgf cm, and maximum efficiency is 65% in a no-load state.

It was demonstrated that the ultrasonic motor of this embodiment was rotated counterclockwise when the phase difference between the driving voltages was set to be 250°. The characteristics at that time were substantially the same as those shown in FIG. 2.

In this embodiment, the head mass 16 adopts stainless steel, and the head mass 13 adopts an Al alloy, and a ratio $k = (\rho_b E_b)^{0.5}/(\rho_a E_a)^{0.5}$ of a square root of products of densities and elastic moduli of the head masses 16 and 13 is 2.8. When the material of the head mass 16 was replaced with copper having k=2.4 or titanium having k=1.7, the resonant frequencies of the longitudinal and torsional vibrations could coincide with each other under conditions of the pressing force 50 kgf and the outer diameter of the head mass 16 of 24 mm or less, and the characteristics of the ultrasonic motor at that time were the same as those shown in FIG. 2. However, when tin having k=1.4 was used, $f_L < f_T$ was established even when the outer diameter of the head mass 16 was 24 mm, and the resonant frequencies could not coincide with each other. In this case, if the outer diameter of the head mass 16 is increased, the resonant frequencies can coincide with other. However, in order to achieve an ultrasonic motor having a small diameter as a whole, the head mass 16 preferably has a small outer diameter, and the above-mentioned countermeasure is not preferable. In order to cause the resonant frequencies of the longitudinal and torsional vibrations to coincide with each other in a state wherein the ratio of the head masses 16 and 13 is 1.2 or less, a ratio of products of densities and elastic moduli must be 1.5 or more.

Figure 3:
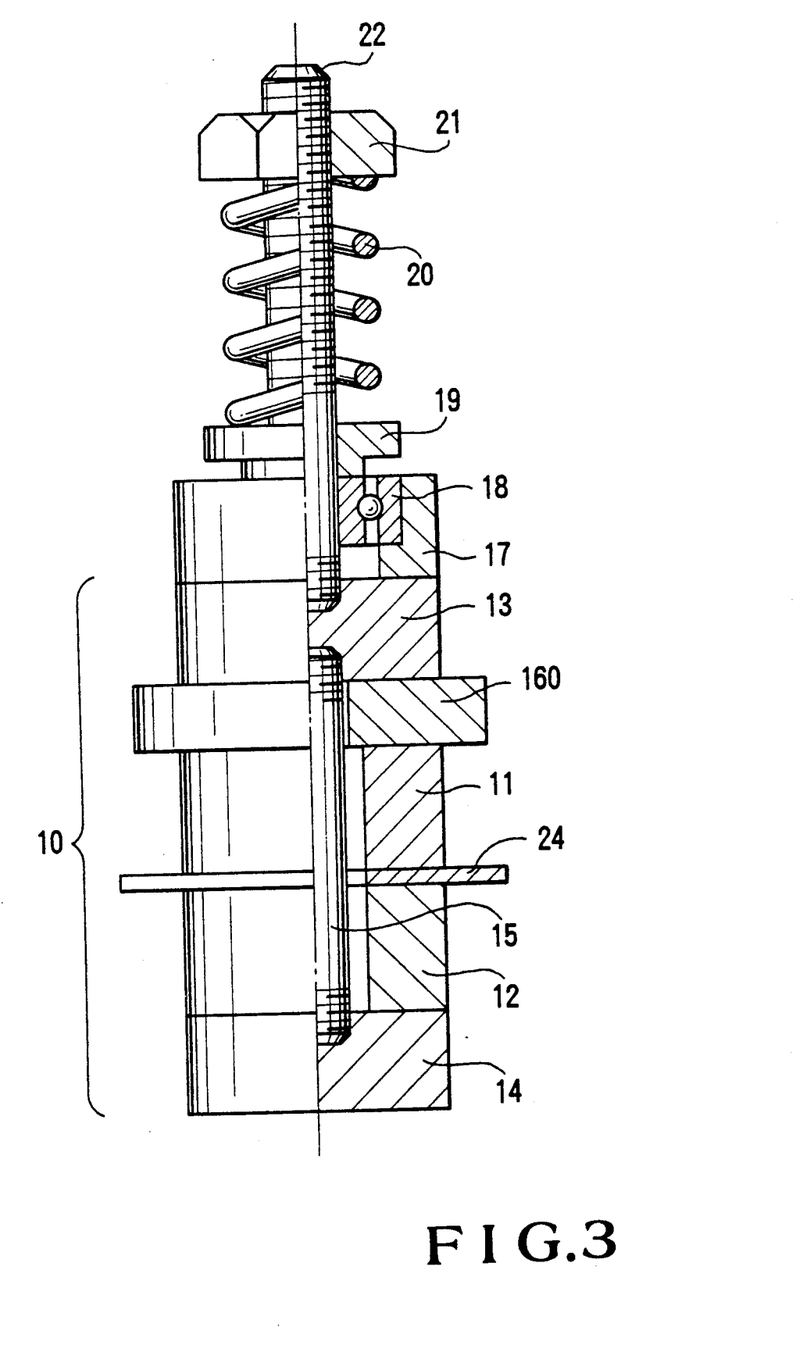
FIG. 3 is a partial sectional front view of the second embodiment.
Figure 4:
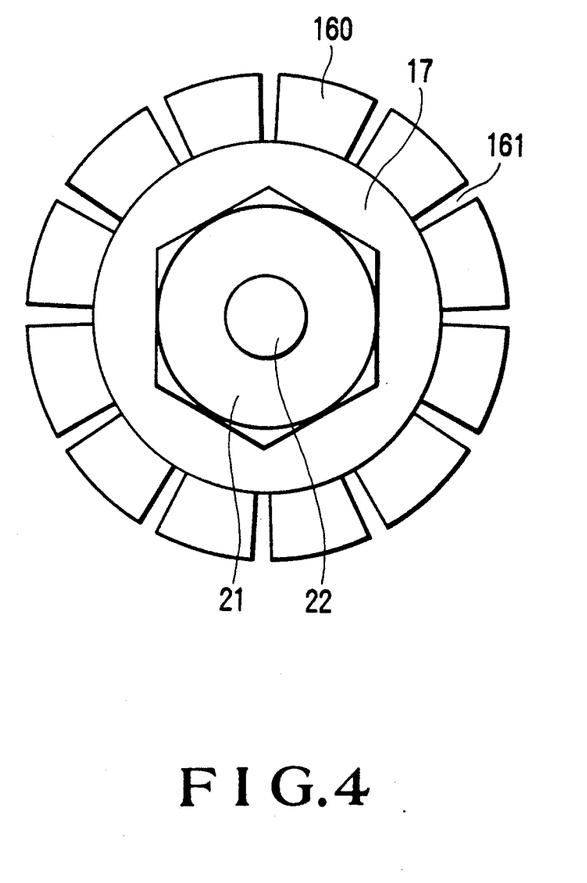
FIG. 4 is a plan view of the second embodiment.

The second embodiment will be described below. FIG. 3 is a partial sectional front view of the second embodiment, and FIG. 4 is a plan view.

Reference numeral 160 denotes a head mass which is substantially the same as the head mass 16, except that a plurality of grooves 161 are formed at equal intervals in its outer periphery. The grooves 161 are formed to decrease the mass of the head mass 160, thus adjusting a frequency. Note that reference numeral 24 denotes a support plate. When the motor is driven in practice, the motor is fixed by the support plate 24.

Figure 5:
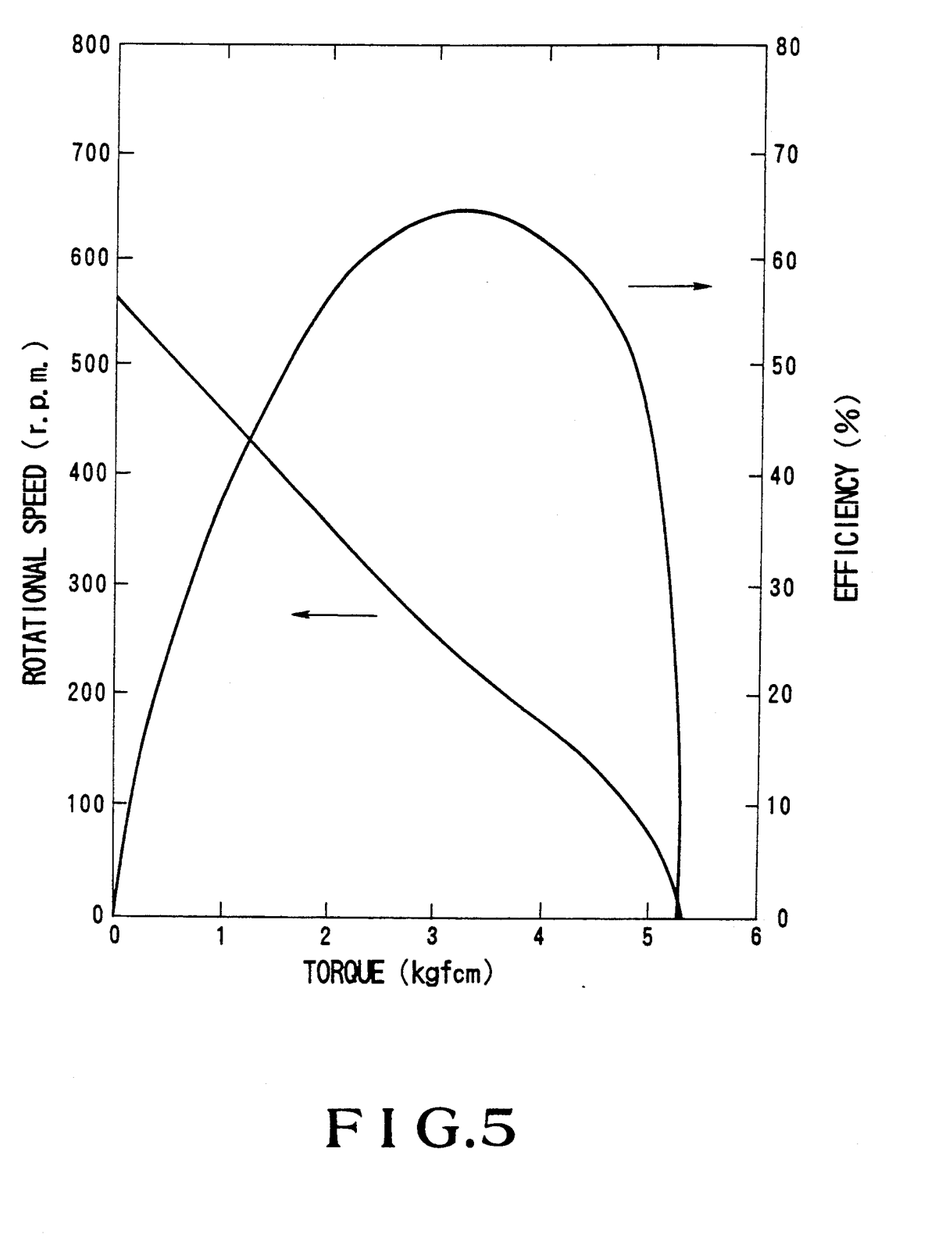
FIG. 5 is a graph showing characteristics of the second embodiment.

FIG. 5 shows measurement results of rotational speed-torque characteristics when the motor was formed with the same dimensions and materials as those in the embodiment shown in FIG. 1, and is substantially the same as FIG. 2. Various characteristics of this embodiment are the same as those in the embodiment shown in FIG. 1.

The third embodiment will be described below. FIG. 6 is a partial sectional front view of the third embodiment. In this embodiment, the outer diameter of a torsional vibration piezoelectric element 120 in the basic structure in the embodiment shown in FIG. 1 is set to be smaller than the outer diameter of a longitudinal vibration piezoelectric element 11. With this structure, since the torsional vibration piezoelectric element 120 serves as a small stiffness in terms of torsional vibration, the resonant frequency of the torsional vibration can be decreased. The outer diameter of a head mass 16 can be smaller than that of the embodiment shown in FIG. 1, and the overall dimensions can be decreased.

The dimensions of this embodiment can be substantially the same as those in the embodiment shown in FIG. 1, except that the outer diameter of each of the torsional vibration piezoelectric element 120 and a rear mass 140 is set to be 12 mm, and the outer diameter of the head mass 16 is set to be 22 mm.

The reduced outer diameter of the torsional vibration piezoelectric element 120 can be applied to the embodiment shown in FIG. 3, and embodiments to be described later.

Figure 7:
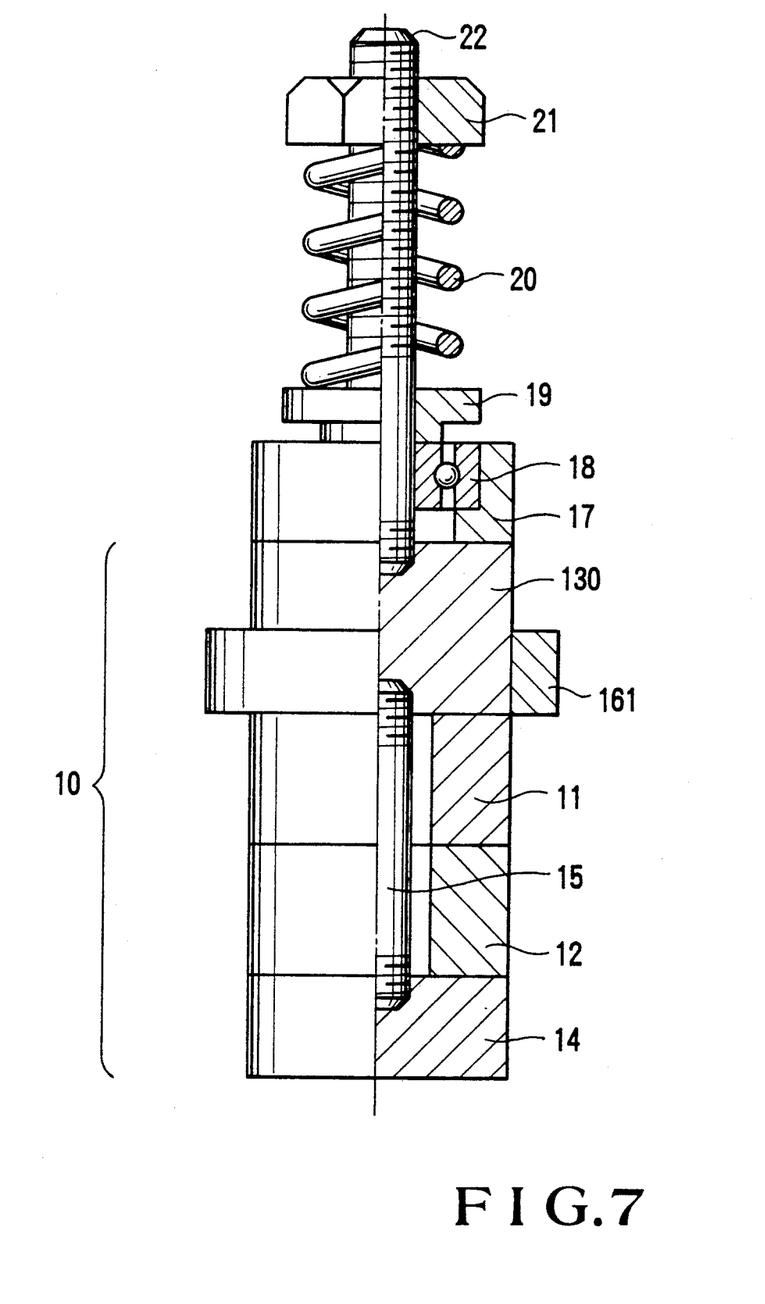
FIG. 7 is a partial sectional front view of the fourth embodiment.

The fourth embodiment will be described below. FIG. 7 is a partial sectional front view of the fourth embodiment. Reference numeral 130 denotes an Al alloy head mass having an outer diameter of 20 mm and a height of 11 mm. Reference numeral 161 denotes a stainless steel ring-like head mass having an inner diameter of 20 mm and an outer diameter of 24 mm. The head mass 161 is integrated with the head mass 130 by striking. This integration may be attained by other methods, e.g., welding. Other parts are the same as those in the embodiment shown in FIG. 1. Since the head mass 160 does not have a large stiffness with respect to longitudinal vibration, it does not almost contribute to a change in resonant frequency of the longitudinal vibration. However, in terms of torsional vibration, since the head mass can serve as a large inertial mass, it can considerably decrease the resonant frequency of the torsional vibration.

When the motor of this embodiment was excited under the same conditions as in the embodiment shown in FIG. 1, the resonant frequency of the longitudinal vibration was 31.6 kHz and the resonant frequency of the torsional vibration was 31.1 kHz. The outer periphery of the head mass 161 was cut off to decrease a mass so as to adjust a frequency, so that the resonant frequencies of the longitudinal and torsional vibrations could coincide with each other at 31.5 kHz.

Figure 8:
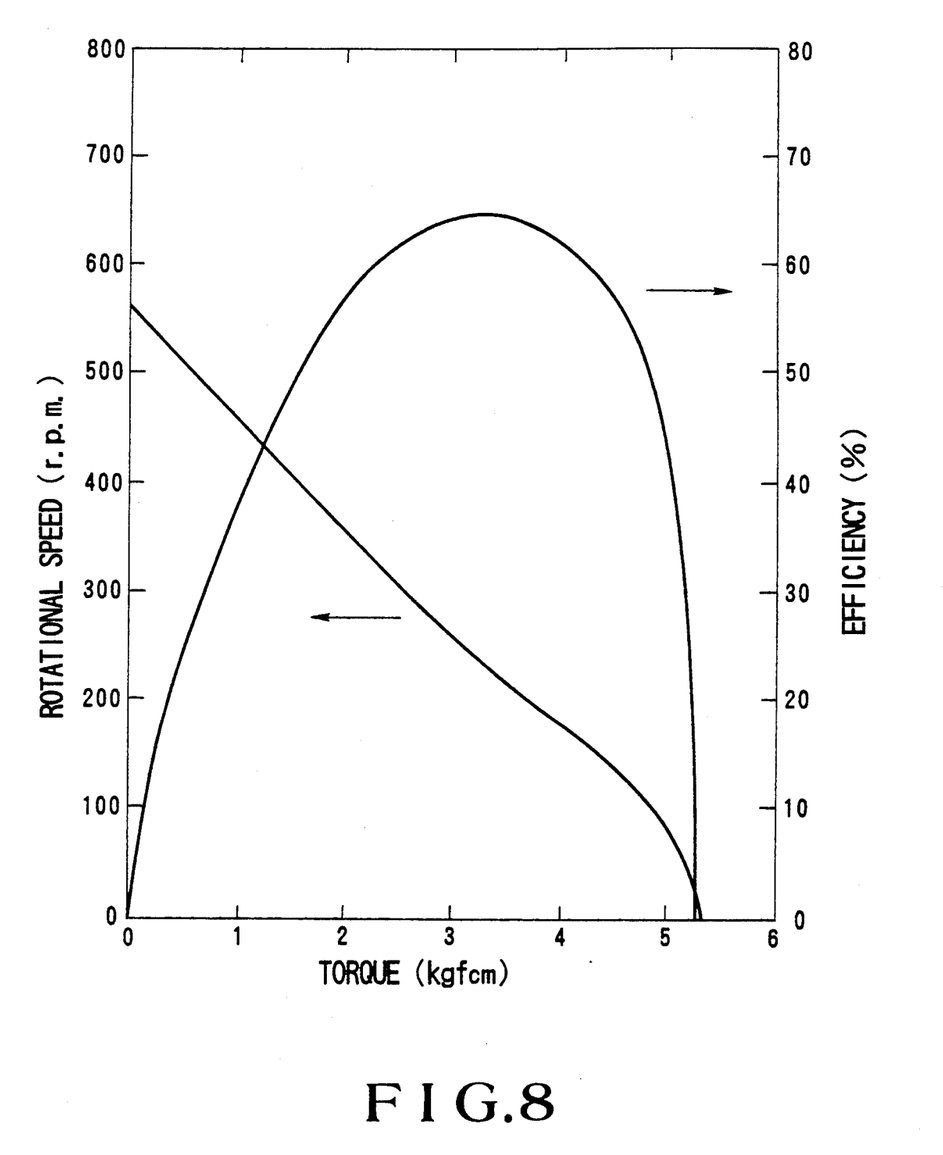
FIG. 8 is a graph showing characteristics of the fourth embodiment.

FIG. 8 shows measurement results of rotational speed-torque characteristics when this motor was rotated clockwise with a voltage value phase difference of 70°. In a no-load state, a rotational speed was 560 r.p.m., a maximum torque was 5.3 kgf·cm, and maximum efficiency was 65%.

The same characteristics as described above were obtained when the motor was rotated counterclockwise.

Figure 9:
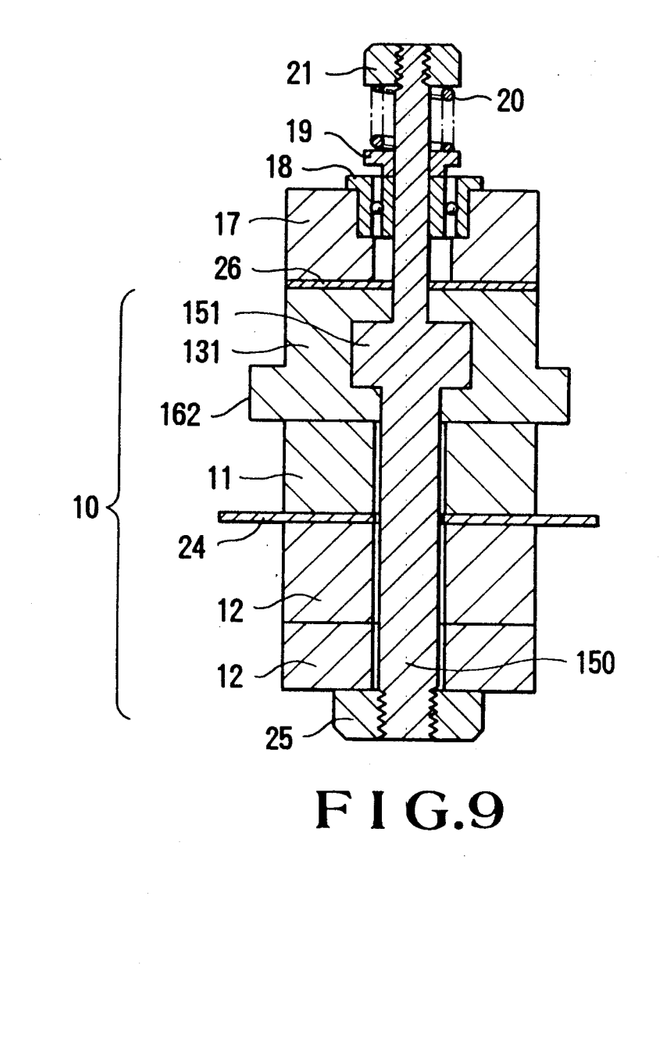
FIG. 9 is a sectional front view of the fifth embodiment.

The fifth embodiment will be described below. FIG. 9 is a sectional front view of the fifth embodiment. The same reference numerals in FIG. 9 denote the same parts as in FIG. 1, and a detailed description thereof will be omitted.

Reference numeral 131 denotes an Al alloy head mass, which is fixed to a collar portion 151 of a bolt 150. A projection 162 is formed on the outer peripheral portion of the head mass 131 near a piezoelectric element.

Note that reference numeral 25 denotes a nut; and 26, a wear-resistant member which is formed of an engineering plastic, and is adhered to a rotor 17.

Figure 10:
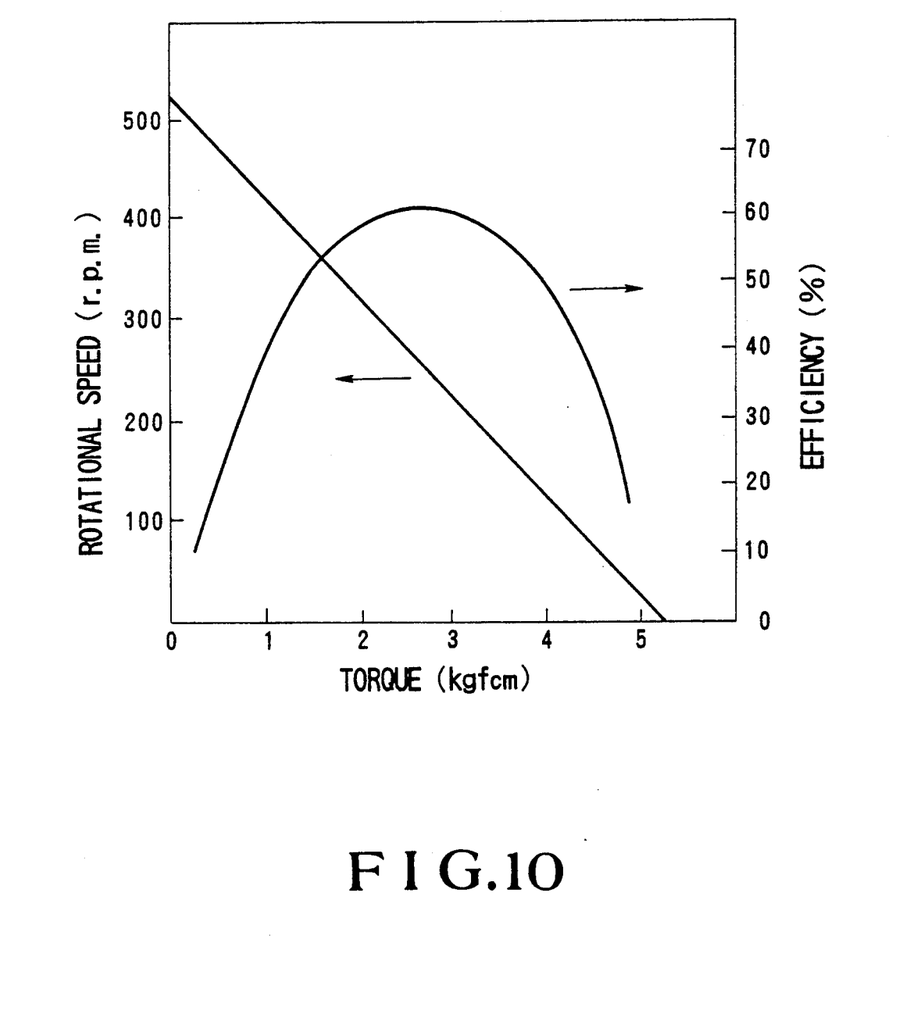
FIG. 10 is a graph showing characteristics of the fifth embodiment.

The mass of the head mass 131 is decreased by slightly cutting off the projection 162 to adjust frequency, so that resonant frequencies of longitudinal and torsional vibrations are caused to coincide with each other. Thereafter, the motor was rotated with application voltages having a phase difference therebetween. FIG. 10 shows measurement results of rotational speed-torque characteristics. In a no-load state, a rotational speed was 520 r.p.m., a maximum torque was 5.1 kgf.cm, and maximum efficiency was 63%.

Figure 11:
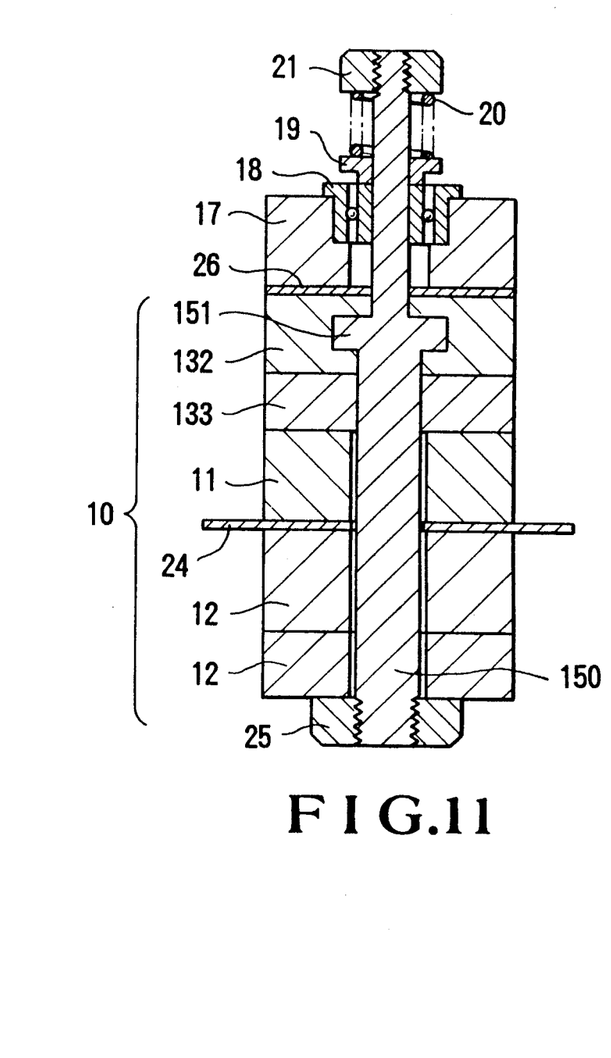
FIG. 11 is a sectional front view of the sixth embodiment.

The sixth embodiment will be described below. FIG. 11 is a sectional front view of the sixth embodiment. The same reference numerals in FIG. 11 denote the same parts as in FIG. 1, and a detailed description thereof will be omitted.

Reference numeral 132 denotes an Al alloy head mass, which is fixed to a collar portion 151. Reference numeral 133 denotes a head mass which is formed of stainless steel having a higher density than that of the head mass 132. The head masses 132 and 133 are integrated by a given means, e.g., welding, adhering, or striking. For example, the head mass 132 is formed to have a height of 4 mm; and an outer diameter of 20 mm, and the head mass 133 is formed to have a height of 7 mm, and an outer diameter of 20 mm. When the height of the head mass 133 is changed to decrease the mass of this portion, the frequency can be adjusted, so that the resonant frequencies can coincide with each other.

Figure 12:
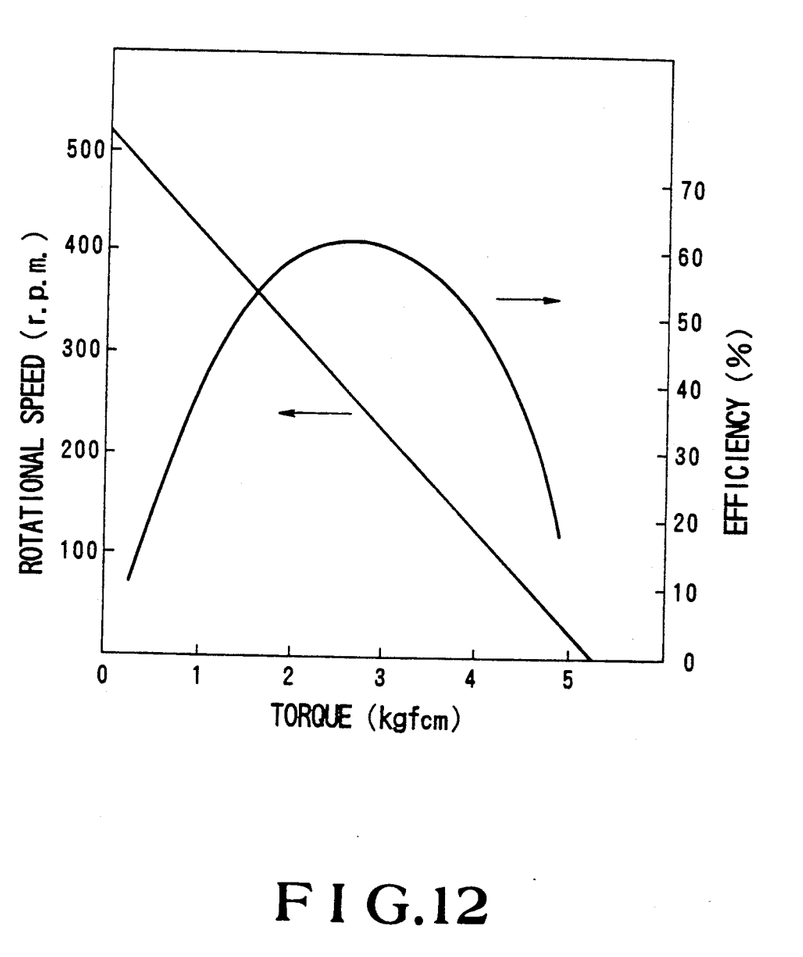
FIG. 12 is a graph showing characteristics of the sixth embodiment.

FIG. 12 shows measurement results of rotational speed-torque characteristics of this embodiment.

As described above, an ultrasonic motor according to the present invention can cause resonant frequencies of longitudinal and torsional vibrations to perfectly coincide with each other in a high-electric field driving mode, and can generate elliptical vibration with a large amplitude at an interface between a stator and a rotor with small power consumption. Thus, a high-efficiency, large-torque ultrasonic motor can be realized. Therefore, technical usefulness of an ultrasonic motor according to the present invention is inestimably large, and application techniques and derivative techniques are unexpectedly widened.

What is claimed is:

1. An ultrasonic motor comprising a rotor and a stator, the stator being urged against the rotor and including first and second blocks and a longitudinal-torsional composite vibrator in which longitudinal and torsional piezoelectric elements are sandwiched between said blocks, wherein said first block is located nearer the rotor than the second block and includes a piezoelectric side portion and a rotor side portion, the inertial mass of the piezoelectric side portion being larger with respect to torsional vibration than that of said rotor side portion.

2. An ultrasonic motor comprising a rotor and a stator, the stator being urged against the rotor and including first and second blocks, the first block being nearer the rotor than the second block, and a longitudinal-torsional composite vibrator in which longitudinal and torsional piezoelectric elements are sandwiched between said blocks, wherein the stator further includes a disk which is formed of a material whose product of its density and its elastic modulus is larger than that of said first block and which is arranged between the first block and the composite vibrator.

3. A motor according to claim 2, wherein grooves are formed in an outer peripheral portion of said disk at equal intervals.

4. A motor according to claim 2, wherein the outer diameter of said torsional vibration piezoelectric element is smaller than the outer diameter of said longitudinal vibration piezoelectric element.

5. A motor according to claim 1, wherein the piezoelectric side portion comprises a member and a ring whose product of its density and its elastic modulus is larger than that of said member, said ring being arranged on the outer periphery of the member.

6. A motor according to claim 1, wherein the diameter of the piezoelectric side portion is larger than that of the rotor side portion.

7. A motor according to claim 1, wherein the first block is formed by joining at least two materials having different densities so that the rotor side portion comprises the low-density material and the piezoelectric side portion comprises the high-density material.

8. A motor according to claim 1 wherein grooves are formed in an outer peripheral region of said piezoelectric side portion.

9. A motor according to claim 1 wherein the outer diameter of said rotor side portion of said first block is greater than the outer diameter of said second block.

10. A motor according to claim 1 further comprising a support plate connected to the stator.

11. A motor according to claim 10 wherein the support plate is sandwiched between the longitudinal and torsional piezoelectric elements.

12. A motor according to claim 1 wherein the piezoelectric side portion and the rotor side portion respectively comprise first and second members integrated to one another.

13. A motor according to claim 1 wherein the outer diameter of said torsional vibration piezoelectric element is smaller than the outer diameter of said longitudinal vibration piezoelectric element.

14. A motor according to claim 2 wherein said disk has an outer diameter larger than he outer diameter of said longitudinal piezoelectric element.

15. A motor according to claim 2 wherein the outer diameter of said disk is larger than the outer diameter of said first block.

16. A motor according to claim 2 wherein the outer diameter of the first block is larger than the outer diameter of the second block.

17. A motor according to claim 2 further comprising a support plate connected to the stator.

18. A motor according to claim 17 wherein the support plate is sandwiched between the longitudinal and torsional piezoelectric elements.

19. A motor according to claim 2 wherein the first block and the disk are integrated to one another.

20. A motor according to claim 1 further comprising a bearing coupled to the rotor, a structure connected to the stator, and a spring coupled between the structure and the bearing for urging the rotor against the stator.

* * * * *